United States Patent [19]
Patterson

[11] Patent Number: 5,820,137
[45] Date of Patent: Oct. 13, 1998

[54] CHUCK APPARATUS FOR CENTERING AND LOCKING ALUMINUM WHEELS

[76] Inventor: Alan C. Patterson, 2484 E. Coon Lake Rd., Howell, Mich. 48843

[21] Appl. No.: 744,736

[22] Filed: Oct. 31, 1996

[51] Int. Cl.$^6$ ............................ B32B 31/18; B32B 31/177
[52] U.S. Cl. ............................ 279/141; 279/106; 279/121; 279/127; 279/133; 279/137; 279/156
[58] Field of Search ...................................... 279/106, 109, 279/121, 127, 133, 137, 141, 143, 145, 156, 158

[56] References Cited

U.S. PATENT DOCUMENTS

| | | | |
|---|---|---|---|
| 3,076,662 | 2/1963 | Kostyrka . | |
| 3,751,053 | 8/1973 | Swanson | 279/119 |
| 4,838,561 | 6/1989 | Baranzelli et al. | 279/127 |
| 5,441,284 | 8/1995 | Mueller et al. | 279/2.02 |

Primary Examiner—Steven C. Bishop
Attorney, Agent, or Firm—Brooks & Kushman P.C.

[57] ABSTRACT

A chuck apparatus is operative to center and lock an aluminum wheel in a lathe having a machining centerline. The chuck includes a face plate adapted for rotation about the centerline, and first, second and third radial slide blocks slidably movable perpendicularly with respect to the centerline and adapted to receive locators. First, second and third clamps are equally spaced about the periphery of the face plate and are adapted for applying a clamping force to the aluminum wheel in a direction parallel to the centerline. The slide blocks are actuated independently of the clamps to facilitate centering of the wheel prior to clamping. The slide blocks are selectively movable in a first direction radially outward from the centerline for causing the locators to engage the wheel and a second direction radially inward to cause the locators to engage the wheel.

15 Claims, 3 Drawing Sheets

CHUCK APPARATUS FOR CENTERING AND LOCKING ALUMINUM WHEELS

TECHNICAL FIELD

The present invention relates to a chuck apparatus for centering and locking aluminum wheels in a lathe.

BACKGROUND OF THE INVENTION

Lathe chucks are known for securing aluminum wheels with respect to the head stock portion of a lathe for turning operations. Typically, the wheel must be centered or located about the centerline of the chuck, and then clamped into position. No known chucks are available which interface with aluminum wheels and have clamping tooling motion which is perpendicular to the locating tooling motion, while providing locating tooling motion which can be easily reversed without requiring substantial mechanical work and detail replacement on the chuck. Additionally, no known chuck assembly provides capability for phasing of motion between clamping and locating, and for adjusting clamping and locating forces without substantial chuck handling.

For example, U.S. Pat. No. 4,838,561 to TVA Holding S.p.A. provides clamping and locating motions which have a physical relationship which cannot be re-phased without disassembly, mechanical modification and reassembly. Adjustment of phasing of motion between clamping and locating, as well as adjustment of pressures applied by clamping and/or locating tooling requires mechanical changeovers for the particular adjustment. Additionally, expensive mechanical work and detail replacement will be required to reverse the motion of the locating tooling. This changeover would be extreme and impractical for this chuck assembly because of the down time and handling required.

Accordingly, it is desirable to provide a chuck assembly in which the clamping motion is perpendicular to the locating motion, the locators are easily reversible, and phasing of motion between clamping and locating, as well as force adjustment for clamping and locating are easily accomplished without substantial chuck teardown and reassembly.

DISCLOSURE OF THE INVENTION

The present invention overcomes the above-referenced shortcomings of prior art assemblies by providing a chuck assembly which interfaces with aluminum wheels and has a clamping motion which is perpendicular to the locating tooling motion, while providing a locating tooling motion which can be easily reversed without substantial chuck teardown and reassembly. Additionally, phasing of motion between clamping and locating, as well as pressure adjustment for clamping and locating motions are easily controlled hydraulically. This is achieved by using a dual action drawbar which independently actuates the locator motion and clamping motion by means of a relatively slidable sleeve disposed about the drawbar. This configuration is used in conjunction with a plurality of cam actuated clamps for applying clamping forces parallel to the machining centerline.

More specifically, the present invention provides a chuck apparatus for centering and locking an aluminum wheel in a lathe having a machining centerline. The chuck comprises a face plate adapted for rotation about the centerline, and first, second and third radial slide blocks slidably movable perpendicularly with respect to the centerline and adapted to receive locators. First, second and third clamps are equally spaced about the periphery of the face plate and are adapted for applying a clamping force to the aluminum wheel in a direction parallel to the centerline. The slide blocks are actuated independently of the clamps to facilitate centering the wheel prior to clamping, and the slide blocks are selectively movable in a first direction radially outward from the centerline for causing the locators to engage the wheel and in a second direction radially inward to cause the locators to engage the wheel.

Accordingly, an object of the present invention is to provide a chuck assembly for locating and clamping aluminum wheels which has a clamping tooling motion which is perpendicular to the locating tooling motion and has a locating tooling motion which can be easily reversed without substantial rebuilding of the chuck.

A further object of the present invention is to provide a chuck assembly in which phasing of motion between clamping and locating is easily adjusted without requiring access to the chuck, and forces applied by the clamping and/or locating tooling may also be adjusted without access to the chuck.

The above objects and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
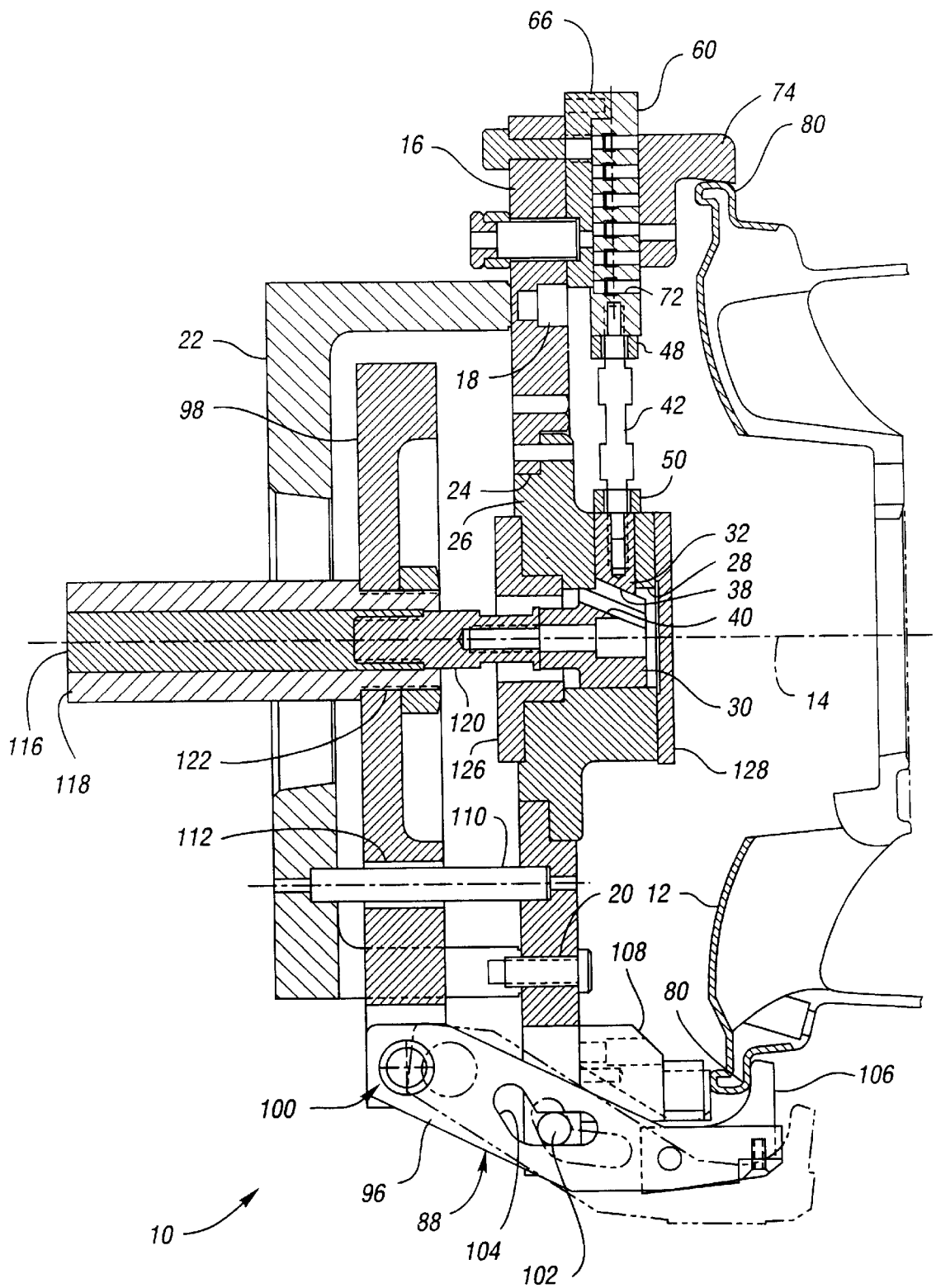
FIG. 1 shows a vertical cross-sectional view of a chuck assembly incorporating a feed-in locator in accordance with the present invention.

Referring to FIG. 1, a chuck apparatus 10 is shown in accordance with the present invention. The chuck apparatus 10 is adapted to center and lock an aluminum wheel 12 with respect to the head stock of a lathe for rotation about a machining centerline 14.

The chuck apparatus includes a face plate 16 which is bolted at bolt locations 18 and 20 to a riser adapter 22. The face plate 16 includes a central bore 24 therein for receiving the housing 26. The housing 26 also includes a central bore 28 for slidably receiving the center cam 30.

Figure 2:
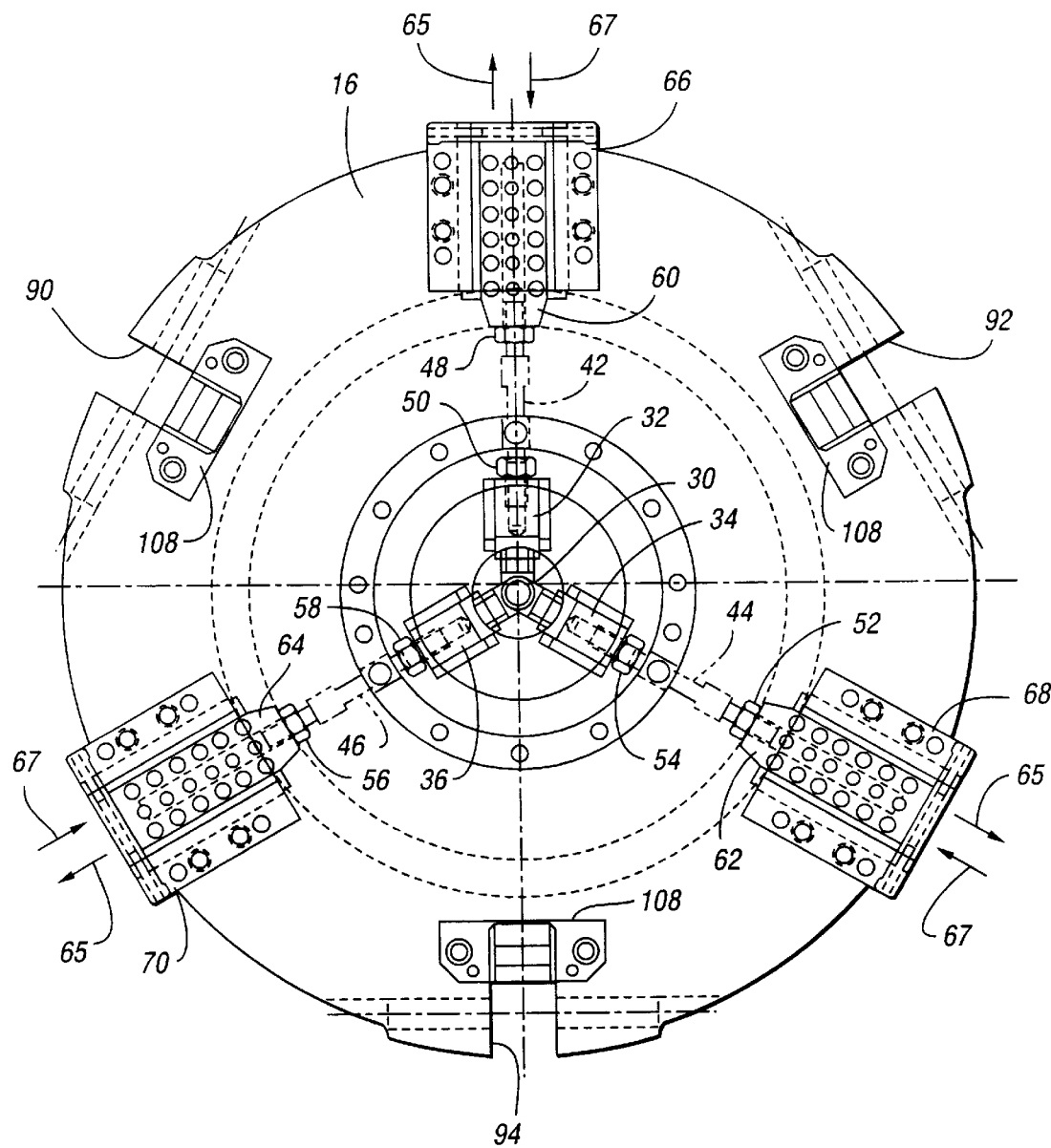
FIG. 2 shows a partially disassembled plan view of the chuck assembly of FIG. 1.

As shown in FIG. 2, first, second and third cam blocks 32, 34, 36 are equally spaced peripherally about the center cam 30. As shown in FIG. 1, the cam blocks 32, 34, 36 each include an angled cam surface 38 which is adapted for sliding interlocking engagement with the respective angled cam surface 40 of the center cam 30. Accordingly, this sliding, interlocking engagement of the center cam 30 with the first, second and third cam blocks 32, 34, 36 is operative to translate motion of the center cam 30 along the centerline 14 to radial motion of the first, second and third cam blocks 32, 34, 36.

As shown in FIGS. 1 and 2, the first, second and third cam blocks 32, 34, 36 are connected, respectively, to adjustable couplings 42, 44, 46. The adjustable couplings 42, 44, 46 are adjustable by means of internally threaded adjustment nuts 48, 50, 52, 54, 56, 58. The adjustable couplings 42, 44, 46 are connected, respectively, to first, second and third radial slide blocks 60, 62, 64. The radial slide blocks 60, 62, 64 are slidable, respectively, within the gib blocks 66, 68, 70. The slide blocks 60, 62, 64 are selectively movable in a first direction 65 radially outward from the centerline 14 for causing the locators to engage the wheel, and in a second direction 67 radially inward toward the centerline 14 to cause the locators to engage the wheel, as illustrated in FIG. 2.

Figure 3:
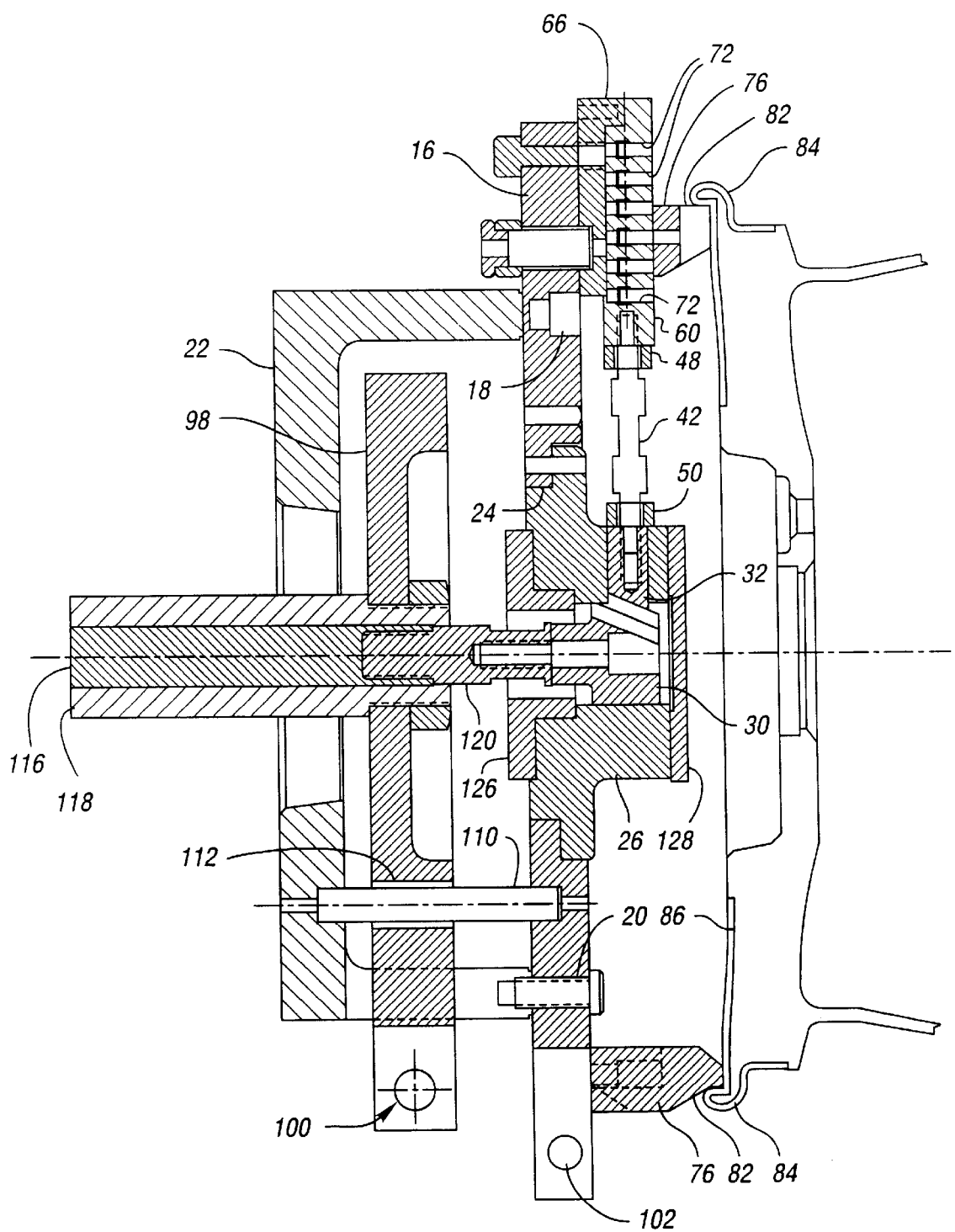
FIG. 3 shows a vertical cross-sectional view of a chuck assembly incorporating a feed-out locator in accordance with the present invention.

As shown in FIGS. 1 and 3, the radial slide blocks 60, 62, 64 include a plurality of apertures 72 formed therein for removable attachment of feed-in locators 74 (shown in FIG. 1) or feed-out locators 76 (shown in FIG. 3). The locators 74,76 are removably bolted to the respective radial slide blocks 60, 62, 64 and are preferably located by dowel pins and locating holes. In order to switch between a feed-in or feed-out locator, the locator is simply unbolted from the respective radial slide block, and replaced with an oppositely facing locator. The feed-in locator 74 (shown in FIG. 1) includes a locating surface 78 which faces inwardly for engaging the outer rim portion 80 of the aluminum wheel 12. The feed-out locator 76 (shown in FIG. 3) includes an outwardly facing locating surface 82 for engaging the inner periphery of the outer rim portion 84 of the aluminum wheel 86.

Accordingly, while prior art assemblies require significant chuck teardown and rebuild for alternating between feed-in and feed-out locators, the present invention only requires removal of one locator and reattachment of an oppositely facing locator by bolting and unbolting the respective locator.

Referring to FIGS. 1 and 2, the chuck apparatus 10 is provided with first, second and third clamps 88 which are equally spaced about the periphery of the face plate 16 and are movable within slots 90, 92, 94 formed in the face plate 16, as shown in FIG. 2. The clamps 88 are adapted for applying a clamping force to the respective aluminum wheel 12 in a direction parallel to the centerline 14. As shown in FIG. 1, each of the clamps 88 comprises a cam arm 96 which is pivotally connected to the yoke plate 98 by means of the cam bearing, pivot pin, and keeper, generally indicated at 100. The cam pin 102 extends from the face plate 16 for engagement within the cam slot 104 formed in the cam arm 96. In this configuration, as the yoke plate 98 moves toward and away from the face plate 16, the cam pin 102 travels within the cam slot 104, thereby causing the cam arm 96 to pivot between the clamped position shown in FIG. 1, and the unclamped position shown in phantom in FIG. 1. The cam arms 96 each include a clamp jaw 106 at the distal end thereof for clamping against the outer rim 80 of the aluminum wheel 12, thereby forcing the outer rim 80 against the respective part rest 108.

A guide pin 110 is provided for guiding sliding movement of the yoke plate 98 with respect to the face plate 16. The guide pin 110 extends through the yoke bearing 112 for such guiding action.

When centering and locking an aluminum wheel within the chuck apparatus 10, it is desirable to first locate the wheel about the centerline 14 on the chuck apparatus 10 prior to clamping. Accordingly, the feeding locators 74,76 must be actuated prior to actuation of the clamps 88 for proper clamping positioning. To accomplish this objective, the clamps 88 are operated independently of the locators 74,76. This is achieved by means of the draw bar 116 and sleeve 118. The draw bar 116 is slidable within the sleeve 118, and therefore operates independently thereof for actuating the locators 74,76 separately from the clamps 88. The draw bar 116 includes a radial clearance with respect to the sleeve 118 for such respective independent motion. The draw bar 116 is connected by a draw bar extension 120 to the center cam 30 for operating the radial slide blocks 60, 62, 64 for moving the locators radially. The sleeve 118 is threaded to the yoke plate 98 at the threaded connection 122 so that the sleeve 118 may actuate the yoke plate 98 with respect to the face plate 16 for causing the cam arms 96 to pivot between clamped and unclamped positions.

In order to operate the sleeve 118 and draw bar 116 independently, a duplex hydraulic rotary actuator cylinder is used. In the preferred embodiment, a duplex hydraulic actuator manufactured by Logansport Machine Company, Inc. of Logansport, Indiana under Product No. S60582 is used. Of course, other actuators could be used. In this configuration, the duplex hydraulic actuator may be used to control phasing of the locator movement with respect to the clamp movement without requiring access to the chuck apparatus 10. The lathe CNC controller will be equipped for facilitating such adjustments. Additionally, the pressures applied by the clamps 88 and locators 74,76 may be easily controlled by the lathe controls without requiring access to the chuck apparatus 10.

The chuck apparatus 10 is also provided with a stop bushing 126 disposed within the housing 26 for limiting movement of the yoke plate 98 with respect to the face plate 16. Additionally, a cover plate or end stop 128 covers the opposing end of the housing 26.

While the best mode for carrying out the invention has been described in detail, those familiar with the art to which this invention relates will recognize various alternative designs and embodiments for practicing the invention within the scope of the appended claims.

What is claimed is:

1. A chuck apparatus for centering and locking an aluminum wheel in a lathe having a machining centerline, the chuck comprising:

a face plate adapted for rotation about the centerline;

first, second and third radial slide blocks slidably movable perpendicularly with respect to said centerline and adapted to receive locators; and first, second and third clamps equally spaced about the periphery of said face plate and adapted for applying a clamping force to the aluminum wheel in a direction parallel to the centerline;

wherein said slide blocks are actuated independently of said clamps to facilitate centering the wheel prior to clamping, and said slide blocks are selectively movable in a first direction radially outward from the centerline for causing said locators to engage the wheel, and in a second direction radially inward to cause said locators to engage the wheel.

2. The chuck apparatus of claim 1, further comprising:

a yoke plate movable with respect to said face plate;

a cam pin extending from said face plate; and wherein each of said clamps comprises a cam arm pivotally connected to said yoke plate, said cam arms each having a cam slot formed therein for cooperating with said cam pin, such that the cam pin travels within the cam slot as the yoke plate is moved with respect to the face plate, thereby causing the cam arm to pivot between clamped and unclamped positions.

3. The chuck apparatus of claim 2, wherein said slide blocks are equally spaced about the periphery of said face plate.

4. The chuck apparatus of claim 2, further comprising:

first, second and third cam blocks connected with said first, second and third slide blocks, respectively, and each having an angled cam surface;

a center cam in interlocking, sliding engagement with said angled cam surface of each of said first, second and third cam blocks; and a drawbar disposed along said centerline and engaged with said center cam for actuating the center cam for moving said cam blocks radially toward or away from the centerline as the drawbar moves along the centerline.

5. The chuck apparatus of claim 4, further comprising:

a sleeve slidably disposed about said drawbar and movable independently thereof, said sleeve being connected to the yoke plate for driving the yoke plate with respect to the face plate for actuating said first, second and third clamps.

6. The chuck apparatus of claim 2, wherein each said cam arm includes a clamp jaw at a distal end thereof and each said cam slot is configured to engage said cam pin in a manner to cause said clamp jaws to move sufficiently radially away from the centerline to allow insertion and removal of a wheel from the chuck when the yoke plate is moved toward the face plate.

7. The chuck apparatus of claim 4, further comprising:

first, second and third adjustable couplings connecting said first, second and third slide blocks with said first, second and third cam blocks, respectively.

8. A chuck apparatus for centering and locking an aluminum wheel in a lathe having a machining centerline, wherein the aluminum wheel has an outer rim portion, the chuck apparatus comprising:

a face plate adapted for rotation about the centerline;

first, second and third radial slide blocks slidably movable perpendicularly with respect to said centerline along said face plate;

first, second and third locators mounted to said first, second and third radial slide blocks, respectively, such that the locators may be moved radially with respect to the centerline for engagement against the outer rim portion for centering the wheel; and first, second and third clamps equally spaced about the periphery of said face plate and positioned for applying a clamping force to the outer rim in a direction parallel to said centerline;

wherein said slide blocks are selectively movable in a first direction radially outward from the centerline for causing said locators to engage the outer rim portion and in a second direction radially inward to cause said locators to engage the outer rim portion.

9. The chuck apparatus of claim 8, further comprising:

a yoke plate movable with respect to said face plate;

a cam pin extending from said face plate; and wherein each of said clamps comprises a cam arm pivotally connected to said yoke plate, said cam arms each having a cam slot formed therein for cooperating with said cam pin, such that the cam pin travels within the cam slot as the yoke plate is moved with respect to the face plate, thereby causing the cam arm to pivot between clamped and unclamped positions.

10. The chuck apparatus of claim 9, wherein said slide blocks are equally spaced about the periphery of said face plate.

11. The chuck apparatus of claim 10, further comprising:

first, second and third cam blocks connected with said first, second and third slide blocks, respectively, and each having an angled cam surface;

a center cam in interlocking, sliding engagement with said angled cam surface of each of said first, second and third cam blocks; and a drawbar disposed along said centerline and engaged with said center cam for actuating the center cam for moving said cam blocks radially toward or away from the centerline as the drawbar moves along the centerline.

12. The chuck apparatus of claim 11, further comprising:

a sleeve slidably disposed about said drawbar and movable independently thereof, said sleeve being connected to the yoke plate for driving the yoke plate with respect to the face plate for actuating said first, second and third clamps.

13. The chuck apparatus of claim 9, wherein each said cam arm includes a clamp jaw at a distal end thereof and each said cam slot is configured to engage said cam pin in a manner to cause said clamp jaws to move sufficiently radially away from the centerline to allow insertion and removal of a wheel from the chuck when the yoke plate is moved toward the face plate.

14. The chuck apparatus of claim 11, further comprising:

first, second and third adjustable couplings connecting said first, second and third slide blocks with said first, second and third cam blocks, respectively.

15. A chuck apparatus for centering and locking an aluminum wheel in a lathe having a machining centerline, the chuck comprising:

a face plate adapted for rotation about the centerline;

first, second and third radial slide blocks slidably movable perpendicularly with respect to said centerline and adapted to receive locators;

first, second and third clamps equally spaced about the periphery of said face plate and adapted for applying a clamping force to the aluminum wheel in a direction parallel to said centerline;

wherein said slide blocks are actuated independently of said clamps to facilitate centering the wheel prior to clamping, and said slide blocks are selectively movable in a first direction radially outward from the centerline for causing said locators to engage the wheel and in a second direction radially inward to cause said locators to engage the wheel;

a yoke plate movable with respect to said face plate;

a cam pin extending from said face plate; and wherein each of said clamps comprises a cam arm pivotally connected to said yoke plate, said cam arms each having a cam slot formed therein for cooperating with said cam pin, such that the cam pin travels within the cam slot as the yoke plate is moved with respect to the face plate, thereby causing the cam arm to pivot between clamped and unclamped positions.

* * * * *